United States Patent
Mitsumoto et al.

(10) Patent No.: US 7,326,811 B2
(45) Date of Patent: Feb. 5, 2008

(54) METHOD FOR PRODUCTION OF (METH)ACRYLIC ACID BY USE OF A SHELL-AND-TUBE HEAT EXCHANGER

(75) Inventors: Tetsuji Mitsumoto, Himeji (JP); Takeshi Nishimura, Himeji (JP); Sei Nakahara, Himeji (JP); Osamu Dodo, Hyogo (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 11/584,233

(22) Filed: Oct. 20, 2006

(65) Prior Publication Data

US 2007/0034363 A1    Feb. 15, 2007

Related U.S. Application Data

(62) Division of application No. 10/254,379, filed on Sep. 25, 2002, now Pat. No. 7,147,048.

(30) Foreign Application Priority Data

Sep. 28, 2001   (JP) ............................. 2001-303326

(51) Int. Cl.
*C07C 51/42* (2006.01)
*C07C 51/16* (2006.01)

(52) U.S. Cl. ............... 562/600; 562/542; 562/532; 165/159; 165/158

(58) Field of Classification Search .............. None
See application file for complete search history.

(56) References Cited

U.S. PATENT DOCUMENTS 4,991,648 A    2/1991   Magari et al. ............... 165/159

FOREIGN PATENT DOCUMENTS

| EP | 1 080 780 A1 | 3/2001 |
|---|---|---|
| EP | 1080780 A1 * | 3/2001 |
| JP | 01-256791 A | 10/1989 |
| JP | 03-156289 A | 7/1991 |
| JP | 05-187792 A | 7/1993 |
| JP | 2749957 B2 | 2/1998 |
| JP | 2001-137688 A | 5/2001 |

* cited by examiner

*Primary Examiner*—Yvonne Eyler
*Assistant Examiner*—Yaté K Cutliff
(74) *Attorney, Agent, or Firm*—Mathews, Shepherd, McKay & Bruneau, PA

(57) ABSTRACT

A shell-and-tube type heat exchanger of the smallest possible length necessary for heat exchange is disclosed which is capable of obtaining uniform distribution of flow of a shell side fluid and substantially eliminating the structural restriction imposed on the shell side. This shell-and-tube type heat exchanger is provided with one annular conduit furnished with not less than two partitions concurrently serving as an expansion joint for introducing and discharging a shell side fluid and allowing the flow path for said shell side fluid to be separated into an introducing part and a discharging part and which comprises a place having no array of heat-transfer tubes in the flow path for said shell side fluid. It prevents the equipment from necessitating an unnecessary enlargement due to the structural restriction on the shell side and enables the shell side fluid to produce a uniform flow.

6 Claims, 9 Drawing Sheets

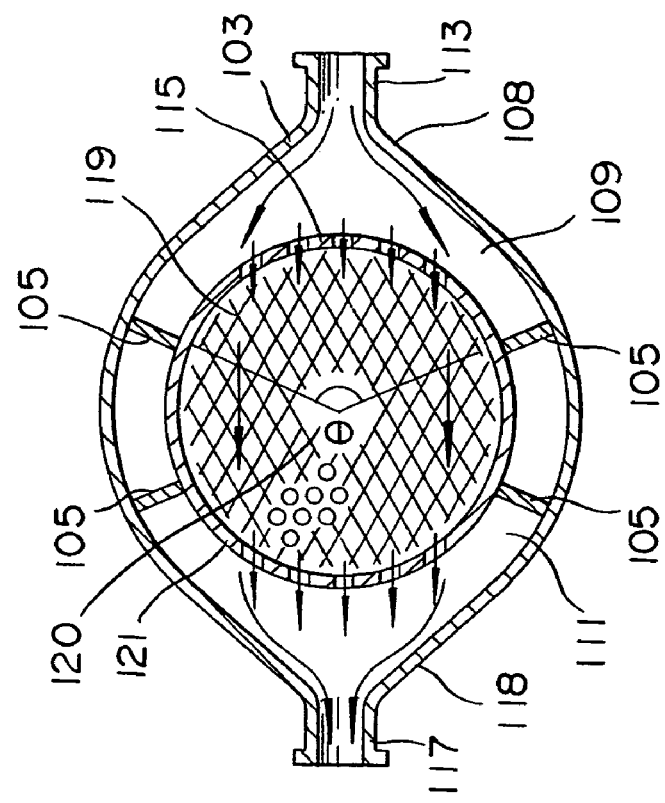
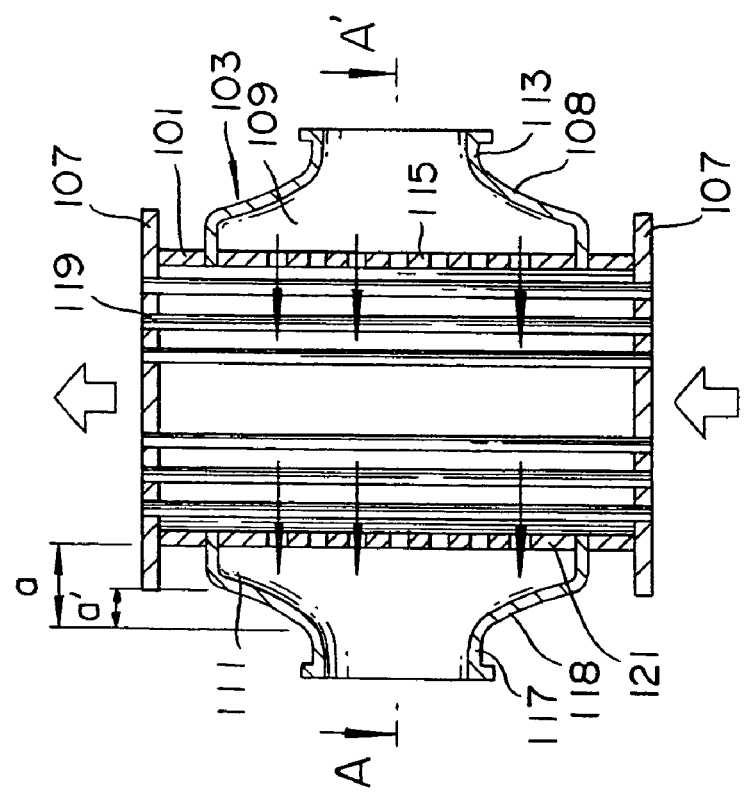

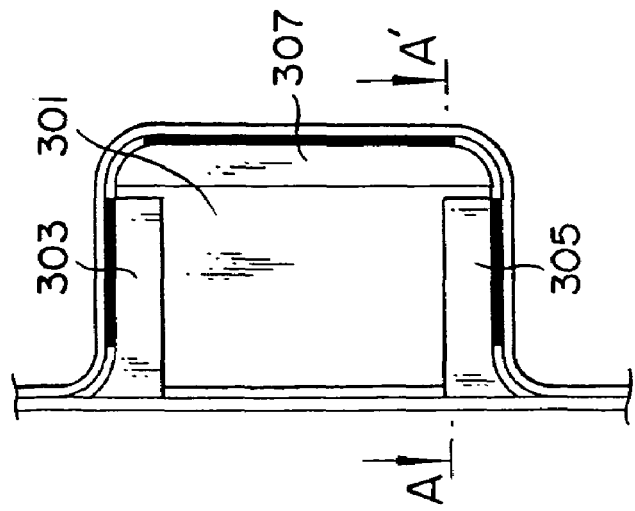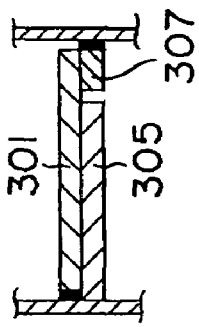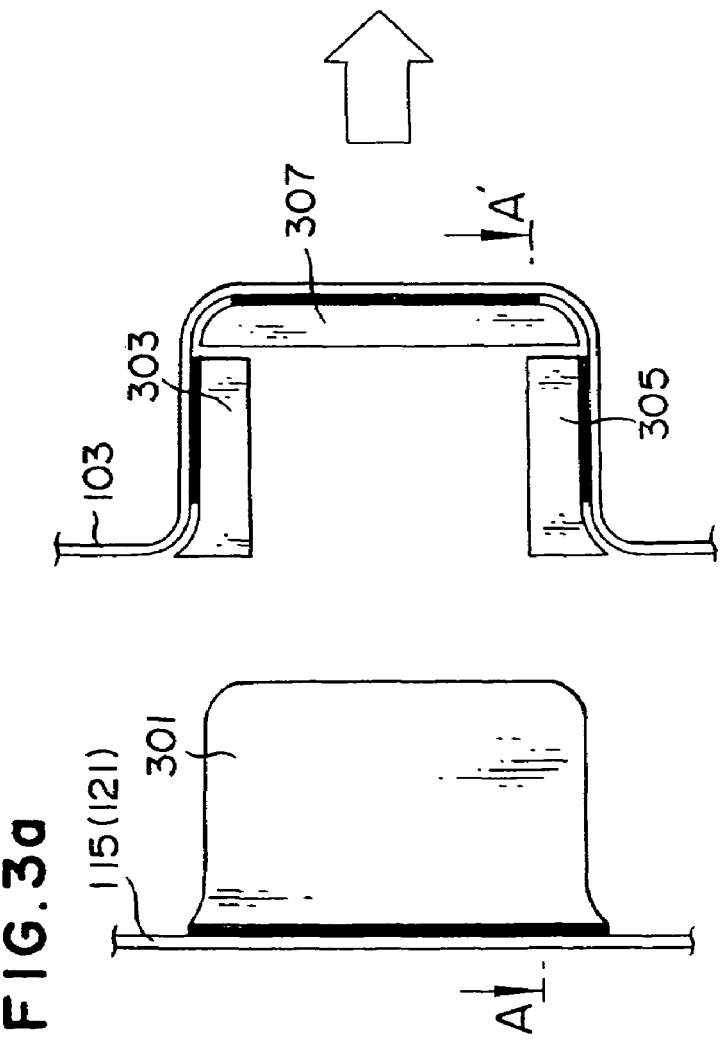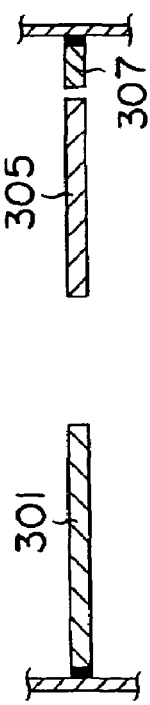

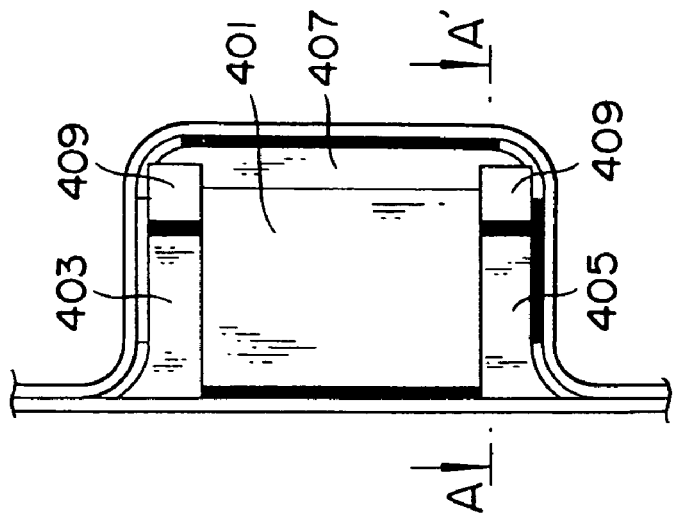
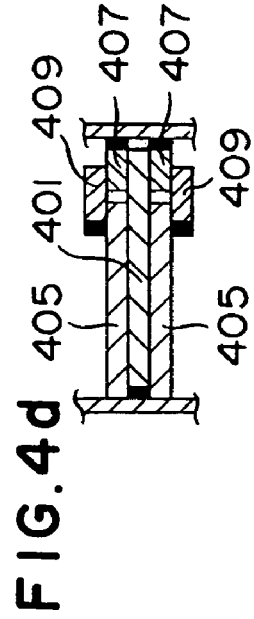
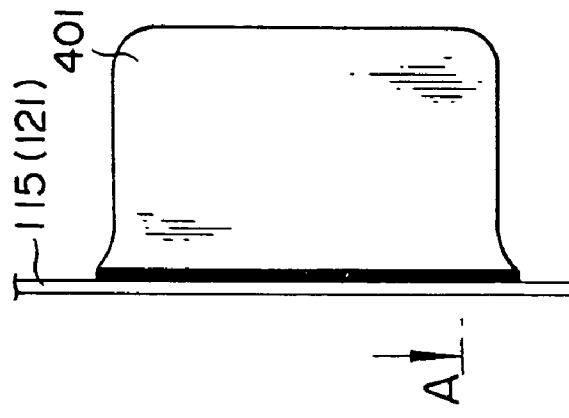
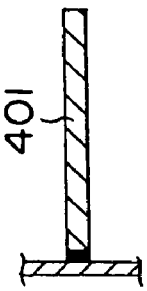

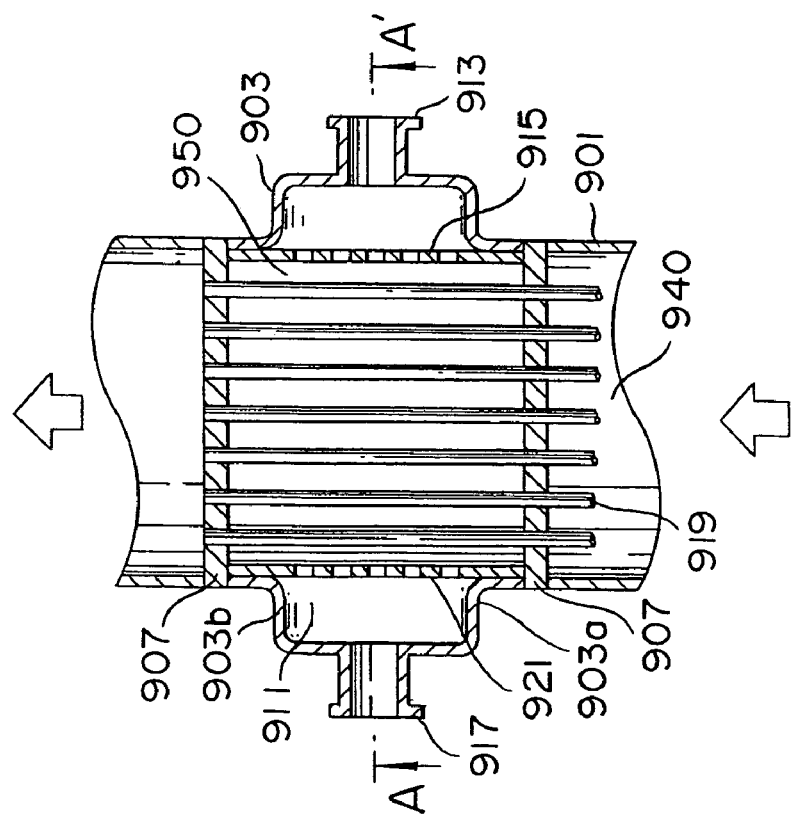

US 7,326,811 B2

METHOD FOR PRODUCTION OF (METH)ACRYLIC ACID BY USE OF A SHELL-AND-TUBE HEAT EXCHANGER

CROSS-REFERENCE TO RELATED APPLICATION

This application is a divisional of U.S. patent application Ser. No. 10/254,379 filed Sep. 25, 2002 now U.S. Pat. No. 7,147,048, hereby incorporated in its entirety by reference into this application.

BACKGROUND OF THE INVENTION

1. Field of the Invention

This invention relates to a shell-and-tube type heat exchanger and more particularly to a shell-and-tube type heat exchanger for use in a shell-and-tube type reactor which is used for catalytic gas phase oxidation. It also relates to a method for the production of (meth)acrylic acid characterized by using the shell-and-tube type heat exchanger for a catalytic gas phase oxidation reactor.

2. Description of the Related Art

Such easily polymerizable substances as acrylic acid and methacrylic acid are useful raw materials for the production and are chemical substances which are produced in large quantities in large-scale commercial plants. Generally, (meth)acrylic acid is produced by subjecting a raw material gas such as propylene, propane, isobutylene, acrolein, or mechacrolein to catalytic gas phase oxidation with a molecular oxygen-containing gas in the presence of an oxidizing catalyst. This catalytic gas phase oxidation is an exothermal reaction which generates a large volume of heat. If this generation of heat is left to take its own course, it will eventually result in shortening the service life of the catalyst, entailing the danger of explosion, and causing variation in the selectivity and the yield of the product. In the production of (meth)acrylic acid, therefore, a shell-and-tube type reactor having a plurality of reaction tubes built in the reactor is used with the object of securing a large surface area for exchange of heat, the reaction tubes are packed with a catalyst and the raw material gas is supplied into the reaction tubes with a view to effecting the reaction of catalytic gas phase oxidation, and a heat transfer medium capable of absorbing the heat of reaction is circulated in the reactor for the sake of removing the heat of reaction generated in the reactor.

Concerning the shell-and-tube type heat exchanger for use in the catalytic gas phase oxidation of this nature, for the purpose of practically eliminating the structural restriction imposed by the thermal expansion due to the difference of temperature between the shell side and the tube side in the reactor to bear on the shell side, Japanese Patent No. 2749957 proposes the concept of introducing and discharging a fluid on the shell side by means of an annular conduit concurrently serving as an expansion joint. FIG. 9(a) is a longitudinal cross section of the shell-and-tube type heat exchanger disclosed by the official gazette of the patent identified above and FIG. 9(b) is a cross section taken through FIG. 9(a) along the line A-A'. A shell 901 partitioned with an upper and a lower tube sheet 907 of the shell-and-tube type heat exchanger has the outer periphery thereof covered with an annular conduit 903. The shell side fluid is introduced through an introducing nozzle 913 into an introducing part distributor 915, advanced laterally in one pass through a tube bundle formed of heat-transfer tubes 919 while effecting heat exchange, and then discharged through a distributor for discharging 921, an annular conduit discharging part 911, and a discharging nozzle 917. An upper and a lower bellows 903a, 903b of the annular conduit 903 are disposed as closely approximated to an upper and a lower tube sheet 907 and partition 905 give rise to a flow path for leading the shell side fluid from an introducing part 909 to the discharging part 911. In the part of the interior of the annular conduit 903 to which the shell fluid is not introduced, a support member 935 is disposed so as to support the annular conduit fast in shape. The annular conduit 903 is disposed in a cooler part 950 which is formed above a reacting part 940.

The central part of the shell, however, incurs large pressure drop due to the numerousness of heat-transfer tubes as compared with the part neighboring the partition 905 of the shell. For the purpose of enabling the shell side fluid to flow toward the center of the shell, it is necessary to secure large pressure drop for the part of the distributor closely neighboring the partition and to take a large head to the circulating pump for the shell side fluid. This difficulty in securing the uniformity of the flow of the fluid becomes particularly conspicuous in a heat exchanger having a large inside diameter of shell and has been causing a great hindrance in recent years to the expansion on a large scale of an industrial production process, namely the expansion of equipment. In order that the effect of uniform and high heat transfer may be obtained in the use of the construction under discussion, it is essential that uniform distribution of the flow of the shell side fluid be realized. A concrete method for implementing this realization is not mentioned anywhere exception the statement that the uniform flow can be obtained by adjusting the number of holes in the distributor and the size of the holes.

The partition 905 disposed in the annular conduit 903 are intended to form the flow path for the shell side fluid and, therefore, are required to prevent the shell side fluid from leaking through the sites of their disposition. The annular conduit, however, expands and contracts in itself because it is provided for the purpose of absorbing the thermal expansion of the reactor on the shell side and the tube side. When the shell side fluid leaks through the partitions, it causes a decline in the thermal efficiency.

An object of this invention, therefore, is to provide a shell-and-tube type heat exchanger which is capable of adapting itself for enlargement of equipment, practically eliminating the structural restriction on the shell side, and securing uniform distribution of flow of the shell side fluid.

Another object of this invention is to provide a shell-and-tube type heat exchanger which allows no leakage of the shell side fluid through the partitions disposed on the annular conduit.

Still another object of this invention is to provide a shell-and-tube type heat exchanger which can be advantageously applied to a shell-and-tube type reactor, particularly to a quenching part in a shell-and-tube type reactor requiring provision of the quenching part subsequently to a reaction part as in a method for the production of (meth)acrylic acid and which can secure uniform distribution of the flow of the shell side fluid and further provide a method for the production of (meth)acrylic acid by the use of the shell-and-tube type heat exchanger.

SUMMARY OF THE INVENTION

The present inventor has pursued diligent studies in search for a shell-and-tube type heat exchanger and a method for the production of (meth)acrylic acid by the use thereof with a view to accomplishing the objects mentioned above and has consequently perfected this invention.

To be specific, the tasks of this invention implied above are accomplished by one annular conduit which concurrently serves as an expansion joint for introducing and discharging a shell side fluid and the existence of a place having no array of heat-transfer tubes in the flow path for the shell side fluid. The tasks are also fulfilled by incorporating the shell-and-tube type heat exchanger in a shell-and-tube type reactor which is used for the catalytic gas phase oxidation in the production of (meth)acrylic acid.

The shell-and-tube type heat exchanger of this invention, by keeping the central part of the tube side thereof having no array of heat-transfer tubes and being provided with one annular conduit furnished with not less than two partitions capable of concurrently serving as an expansion joint for introducing and discharging the shell side fluid and separating the flow path for the shell side fluid into an introducing part and a discharging part as well, is enabled to preclude the enlargement or equipment otherwise necessitated on account of the structural restriction on the shell side and acquire uniform flow of the shell side fluid.

It is when a heat exchanger having the shell side thereof divided with a shield plate disposed perpendicularly to the direction of the axis of the shell is used as a reactor for catalytic gas phase oxidation, the reactor consequently allowed to utilize the divided shell portions as a reaction part and a quenching part, and the quenching part formed of a shell-and-tube type heat exchanger endowed with the characteristic features of this invention that this invention is advantageously utilized. In addition to the effects already enumerated, this configuration brings the effect of preventing the quenching part from succumbing to the phenomenon of autoxidation which will be specifically described herein below.

BRIEF DESCRIPTION OF THE DRAWINGS

FIG. 1(a) is a schematic side view illustrating in type section a heat-transfer part which is the main component of a shell-and-tube type heat exchanger of this invention which is keeping one or more places having no array of heat-transfer tubes and equipped with an annular conduit used for introducing and discharging the shell side fluid. FIG. 1(b) is a cross section taken through FIG. 1(a) along the line A-A', specifically a schematic cross section taken perpendicularly to the axial direction of heat-transfer tubes to illustrate in type section a typical example of the mode of embodiment of a part of the flow path for the shell side fluid which allows no formation of an array of heat-transfer tubes. The rhombic patterns of the interiors of the shell-and-tube type heat exchangers in FIG. 1(b) illustrates in type section the zone which allows the existence of heat-transfer tubes.

FIG. 3 is a longitudinal section illustrating a partition adapted in this invention to serve concurrently as an expansion joint and composed of four members. FIG. 3(a) is a longitudinal section illustrating one partition member 301 and three clearances closing members 303, 305, and 307 as held in individually separated states prior to their assemblage, FIG. 3(b) is a cross section taken through FIG. 3(a) along the line A-A', FIG. 3(c) is a longitudinal section illustrating a complete partition resulting from assembling the partition member and the clearance closing members, and FIG. 3(d) is a cross section taken through FIG. 3(c) along the line A-A'.

FIG. 4 is a longitudinal section illustrating a partition adapted in this invention to serve concurrently as an expansion joint and composed of 11 members. FIG. 4(a) is a longitudinal section illustrating one partition member and 10 clearance closing members as held in individually separated states prior to their assemblage, FIG. 4(b) is a cross section taken through FIG. 4(a) along the line A-A', FIG. 4(c) is a longitudinal section illustrating a complete partition resulting from assembling the partition member and the clearance closing members, and FIG. 4(d) is a cross section taken through FIG. 4(c) along the line A-A'.

FIG. 7 is a diagram illustrating the positions actually used in measuring the tube side temperature in a working example cited herein.

FIG. 9 is a schematic diagram illustrating in type section an annular conduit to be used in a heat transferring part, i.e. a main component of the conventional shell-and-tube type heat exchanger, for introducing and discharging a shell side fluid; FIG. 9(a) is a diagram illustrating the longitudinal section of the shell-and-tube type reactor furnished with an annular conduit for introducing and discharging and FIG. 9(b) is a section taken through FIG. 9(a) along the line A-A'. The rhombic patterns of the interiors of the shell-and-tube type heat exchangers in FIG. 9(b) illustrates in type section the zone which allows the existence of heat-transfer tubes.

DESCRIPTION OF THE PREFERRED EMBODIMENTS

Figure 2C:
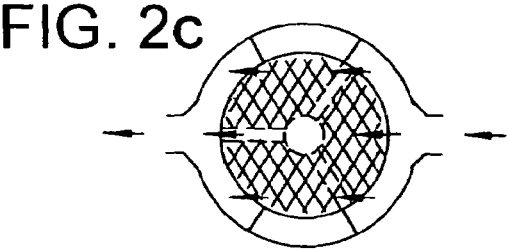
FIGS. 2(c)-(n) are in variably illustrations of across section taken through FIG. 1(a) along the line A-A', specifically schematic cross sections taken perpendicularly to the axial direction of heat tubes to illustrate in type section a number of typical examples of the mode of embodiment of one or more places allowing no formation of an array of heat-transfer tubes. The rhombic patterns of the interiors of the shell-and-tube type heat exchangers in FIGS. 2(c)-(n) illustrate in type section the zones which allow the existence of heat-transfer tubes.
Figure 2D:
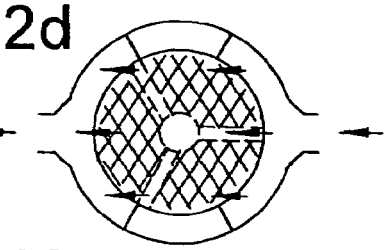
Figure 2E:
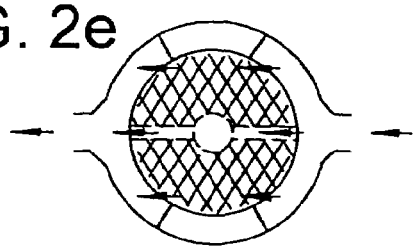
Figure 2F:
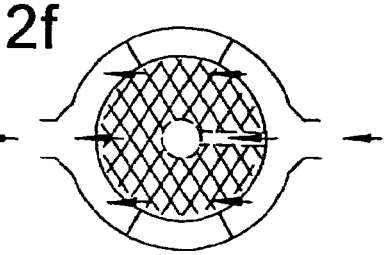
Figure 2G:
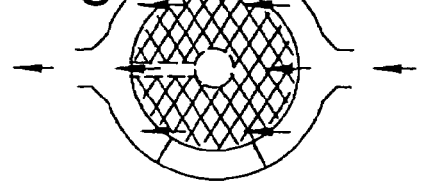
Figure 2H:
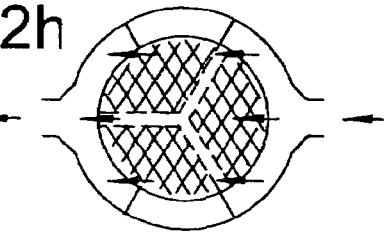
Figure 2I:
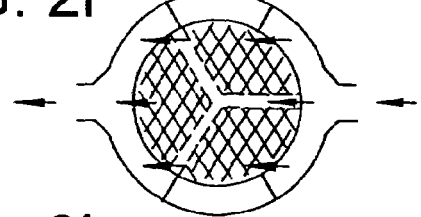
Figure 2J:
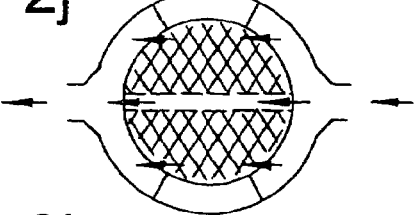
Figure 2K:
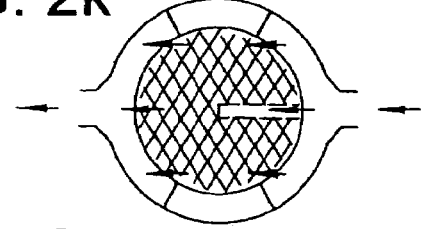
Figure 2L:
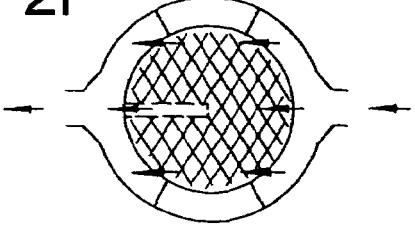
Figure 2M:
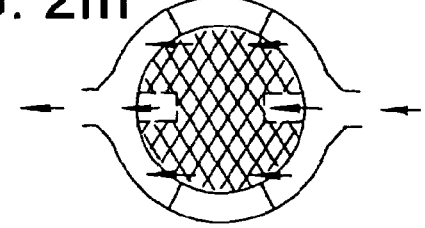
Figure 2N:
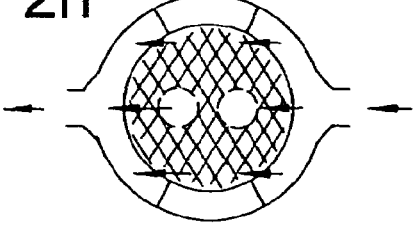

The shell-and-tube type heat exchanger according to the first aspect of this invention is provided with one annular conduit which is furnished with not less than two partitions concurrently serving as an expansion joint for introducing and discharging a shell side fluid and allowing separation of the flow path for the shell side fluid into an introducing part and a discharging part. The heat exchanger, by causing the existence in the flow path for the shell side fluid a place having no array of heat-transfer tubes is enabled to attain practical elimination of the structural restriction on the shell side and acquire a uniform distribution of flow of the shell side fluid.

Now, the shell-and-tube type heat exchanger will be described below with reference to the drawings annexed hereto. FIG. 1(a) is a longitudinal section of a shell-and-tube type heat exchanger causing the existence in the flow path for a shell side fluid a place having no array of heat-transfer tubes. FIG. 1(b) and FIGS. 2(c)-(n) are sections taken through FIG. 1(a) along the line A-A', i.e. schematic sections taken perpendicularly to the axial direction of the heat-transfer tubes to illustrate in type section a number of typical examples of the mode of embodiment of the part not allowing formation of an array of heat-transfer tubes in the flow path for a shell side fluid. The rhombic patterns of the interiors of the shell-and-tube type heat exchangers of FIGS. 2(c)-(n) indicate the ranges allowing the existence of heat-transfer tubes.

FIGS. 1(a) and (b) are diagrams illustrating a shell-and-tube type heat exchanger having no heat-transfer tube arrayed in the central part of a tube bundle as one example of the existence in the flow path for a shell side fluid a place having no array of heat-transfer tubes as contemplated by this invention. A shell 101 delimited with an upper and a lower tube sheet 107 has the outer periphery thereof covered with an annular conduit 103. The shell side fluid is introduced through an introducing nozzle 113 and via a distributor 115, made to flow across a tube bundle formed of heat-transfer tubes 119 in one pass while exchanging heat with the tube bundle, and thereafter discharged through a distributor 121, an annular conduit discharging part 111, and a discharging nozzle 117. In the annular conduit 103, the shell side fluid is introduced from the introducing nozzle 113 into the shell 101 via a connecting part 108 for joining the introducing nozzle 113 and an annular conduit introducing part 109. The connecting part 108 adjoined to the introducing nozzle 113 is so constructed as to be gradually enlarged diameter in order that the uniform distribution of the flow of the shell side fluid inside the shell may be further promoted. The central part of a tube bundle formed of a multiplicity of heat-transfer tubes 119 inside the shell allows the existence of a part forming no array of heat-transfer tubes 119. The annular conduit discharging part 111 is provided on the outlet side thereof for the shell side fluid with a connecting part 118 to be adjoined to the discharging nozzle 117. This connecting part 118 is gradually contracted diameter toward the discharging nozzle 117 in order that the uniform distribution of the flow of the shell side fluid may be promoted in the shell. This construction is similar in the connecting part 108.

FIGS. 2(c)-(n) are diagrams for illustrating the place having no array of heat-transfer tubes. The part of this description does not need to be particularly limited to the constructions illustrated herein but is only required to be so constructed as to facilitate the inflow of the shell side fluid toward the center and/or the outflow thereof away from the center. Particularly for the sake of ensuring the uniformity of distribution of the flow, it is preferable to avoid the formation of an array in the central part of the tube bundle and particularly preferable to avoid the formation of an array in the central part and in a plurality of linear parts directed from the outer periphery toward the center as in the constructions of (c)-(g), for example. When a given construction is such as contains in the central part of the tube bundle the place 120 having no array of heat-transfer tubes, it is enabled to acquire only a comparatively small pressure drop difference within the shell while the shell side fluid is passing the interior of the shell because the difference between the numbers of heat-transfer tubes intersecting the central part of the shell and the part neighboring a partition 105 is decreased. Even when the shell side fluid is made to flow through the center of the shell, therefore, the pressure drop in the part neighboring the partition disposed in the annular conduit can be rendered comparatively small and the head of the circulating pump for the shell side fluid does not need to be increased. Further, the construction which is capable of ensuring the uniformity under discussion can acquire a particularly conspicuous effect in a heat exchanger using a shell of a large inside diameter and can greatly contribute to the recent trend of industrial production processes toward enlargement, namely to the enlargement of equipment. The provision of the connecting part 108 for joining the introducing nozzle and the annular conduit introducing part and the provision of the connecting part 118 for joining the discharging nozzle and the annular conduit discharging part in the manner described above are more effective in further promoting the uniform distribution of the flow of the shell side fluid within the shell.

The total sectional area of the part forming no array of heat-transfer tubes on the tube side is preferably in the range of 0.25-10% and more preferably in the range of 0.5-5% based on the sectional area of the shell. The statement "the total sectional area of the part forming no array" as used herein means the total area of such circles or tetragons as are assumed to be inscribed in one empty space forming a continuous part allowing no array of heat-transfer tubes, providing that the outer peripheral part of the tube bundle is not included in the part allowing no formation of an array of heat-transfer tubes. The term "sectional area of the shell" is based on the inside diameter of the shell excluding the annular conduit. The part 120 which allows no existence of heat-transfer tubes may occur at a plurality of points. If the total area of the part allowing no existence of heat-transfer tubes falls short of 0.25% of the sectional area of the shell, this shortage will be at a disadvantage in entailing a large pressure drop in the central part and incurring difficulty in causing the shell side fluid to flow uniformly even by adjusting the number and size of holes in the distributor which will be specifically described herein below. Conversely, if the total area exceeds 10%, the excess will cause such an addition to the diameter of the shell used for arraying a necessary number of heat-transfer tubes as renders the relevant operation uneconomical. The place having no array of heat-transfer tubes may be left an empty space. Optionally, this part may be used as a site for the installation of a cylinder capable of uniformly adjusting the flow rate of a fluid.

The shape of the partition 105 does not need to be particularly restricted but is only required to be capable of separating the annular conduit into an introducing part and a discharging part for the shell side fluid. In the case of a shell-and-tube type heat exchanger which is provided with one annular conduit furnished with not less than two partitions concurrently serving as an expansion joint for introducing and discharging the shell side fluid and enabling the flow path for the shell side fluid to be separated into an introducing part and a discharging part, at least one of the partition is preferred to be composed of not less than four members. Since this shell-and-tube type heat exchanger relies on the introduction of the shell side fluid to attain necessary exchange of heat with the tube bundle and the shell side fluid produces a large temperature difference when the operation of the reactor is suspended and when the operation is in process, the annular conduit particularly stands in need of a mechanism for alleviating thermal expansion, namely a mechanism serving as an expansion joint. In the partition, therefore, since one plate cannot be welded throughout the entire surface thereof to the interior of the annular conduit, there are times when the shell side fluid held in the introducing part will possibly pass through the interior of the shell into the discharging part via the clearance between the partition and the annular conduit. Since this leakage in the partition results in lowering the efficiency of heat transfer, it is necessary that the amount of the fluid suffered to leak in the partition be minimized. This invention, therefore, contemplates having one partition composed, as illustrated in FIG. 3, of at least four members, i.e. the partition 301, the upper clearance closing member 303, the lower clearance closing member 305, and the lateral clearance closing member 307. This construction can decrease the leakage. To the construction of this partition, the question whether or not a part allowing no formation of an array of heat-transfer tubes exists in the flow path for the shell side fluid is irrelevant.

The second aspect of this invention is directed toward a shell-and-tube type heat exchanger which is provided with one annular conduit furnished with not less than two partitions concurrently serving as an expansion joint for introducing and discharging the shell side fluid and enabling the flow path for the shell side fluid to be divided into an introducing part and a discharging part, which heat exchanger has at least one of the partition composed of not less than four members. The section of the annular conduit, as illustrated in FIG. 3(a), is possessed of a lower part, a lateral part, and an upper part. When these parts are thermally expanded, therefore, the section gives rise to a change in size because the expansion is allowed to advance in at least three directions. When the partition is composed of less than four component members, there are times when the leakage through any of the upper part, lower part, and lateral part of the partition or through an arbitrary combination of such parts will not be avoided. The leakage is prevented more effectively by having clearance closing members 403, 405, and 407 disposed on the opposite sides of a partition 401 and further having a member 409 capable of closing the clearances between the upper clearance closing member 403 and the lower clearance closing member 405 on one part and the lateral clearances closing member 407 on the other part disposed as illustrated in FIG. 4. In this case, the number of component members is 11. If the number of component members exceeds 11, the excess will simply result in complicating the construction and will bring virtually no addition to the effect of preventing the leakage. The number of partition does not need to be particularly restricted so long as it exceeds 2 per annular conduit. When the central angle (θ) of the opening part of the distributor which will be specifically described herein below is set at less than 180° C., such partition may be disposed at not less than four places. The amount of the leakage can be minimized by having partition disposed at 6-8 places. This range of 6-8, therefore, proves particularly favorable. When the partition are disposed at not less than 4 places, the annular conduit excluding the introducing part and the discharging part is preferred to be so constructed as to be filled to capacity with the shell side fluid, specifically by causing a band plate separating the annular conduit and the interior of the shell to be provided with weep holes, for example. If the number of partition exceeds 8, the excess will scarcely produce a proportionate addition to the effect of preventing the leakage.

The annular conduit is provided with the introducing nozzle 113 and the discharging nozzle 117 one each respectively through the medium of the connecting parts 108 and 118. The sectional areas of the places of union of the connecting parts 108 and 118 with the annular conduit are preferably 1.1-5.0 times, and more preferably 1.2-4.0 times, the sectional areas of the places of union of the connecting parts with the introducing nozzle 113 and the discharging nozzle 117. If the sectional areas of the places of union with the annular conduit fall short of 1.1 times the sectional areas of the places of union with the introducing nozzle, the shortage will render it difficult to obtain uniform distribution of flow of the shell side fluid inclusive of the flow in the annular conduit. If the former sectional areas conversely exceed 5.0 times the latter sectional areas, the excess will manifest no appreciable addition to the effect on the uniformity of distribution of the flow. The shape of the sectional areas of the places of union of the connecting parts with the annular conduit does not need to be limited to a circle but may be arbitrarily selected from among various elliptic patterns, polygonal patterns, and indeterminate patterns. Further, the width "a'" of protuberance of the connecting parts 108 and 118 is preferably in the range of 0.05-0.80, and more preferably in the range 0.07-0.75, relative to the distance "a" between the shell 101 and the discharging nozzle 117 as illustrated in FIG. 1(a). The reason for this range is that the uniform distribution of flow is obtained infallibly on the shell fluid side.

Figure 5:
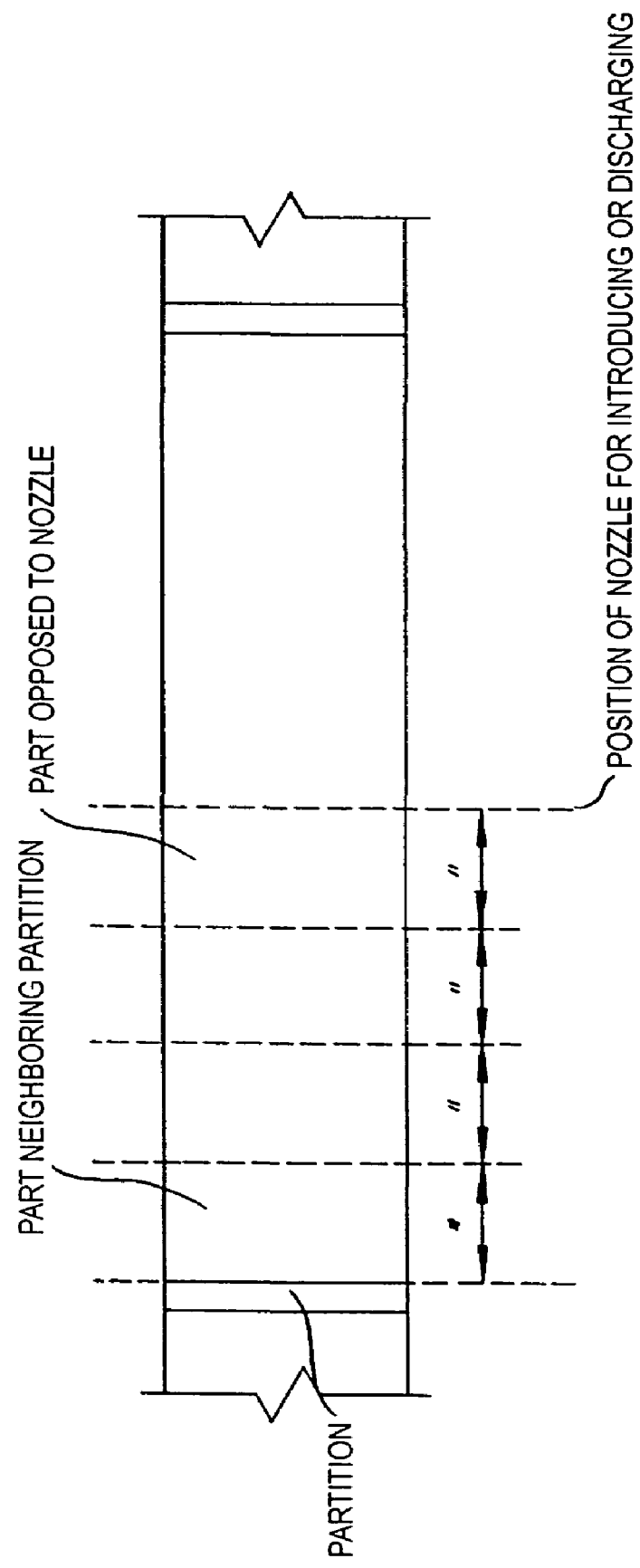
FIG. 5 is a diagram for explaining a "part opposed to the nozzle" and a "part neighboring the partition" in the row of openings in the distributor provided in said shell for use in this invention.
Figure 6A:
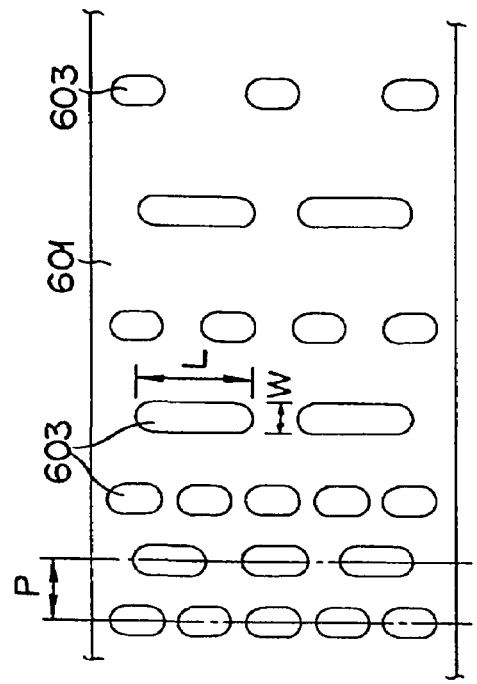
FIGS. 6(a)-(d) are diagrams each illustrating a varying mode of embodiment of the distributor for the shell side fluid in shell-and-tube type heat exchanger contemplated by this invention, i.e. simplified diagrams illustrating in type section the manner in which an opening part formed in the distributor is possessed of a plurality of rows of openings allowing inflow and outflow of the shell side fluid and also possessed of a plurality of zones inserting varying intervals between adjacent rows of openings and containing varying numbers of openings in different rows of openings.
Figure 6C:
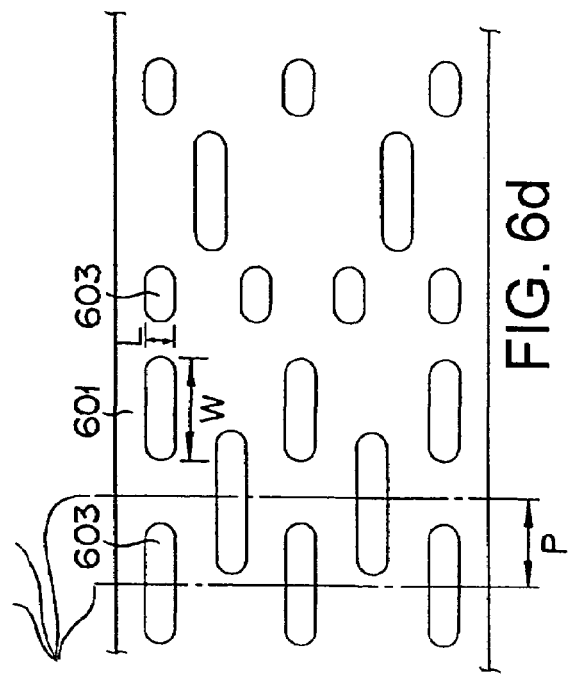
Figure 6B:
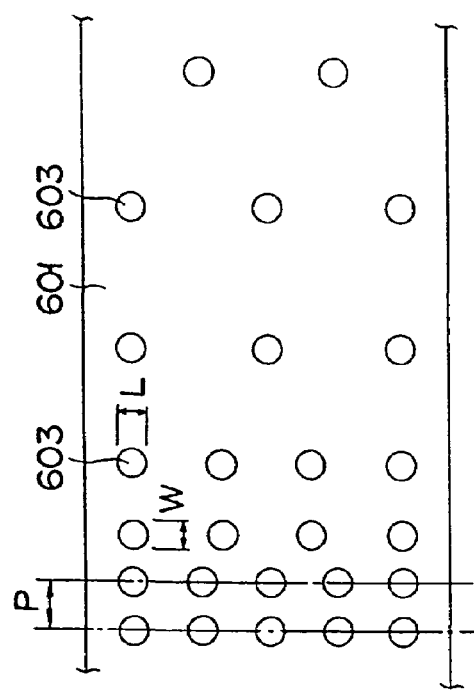
Figure 6D:
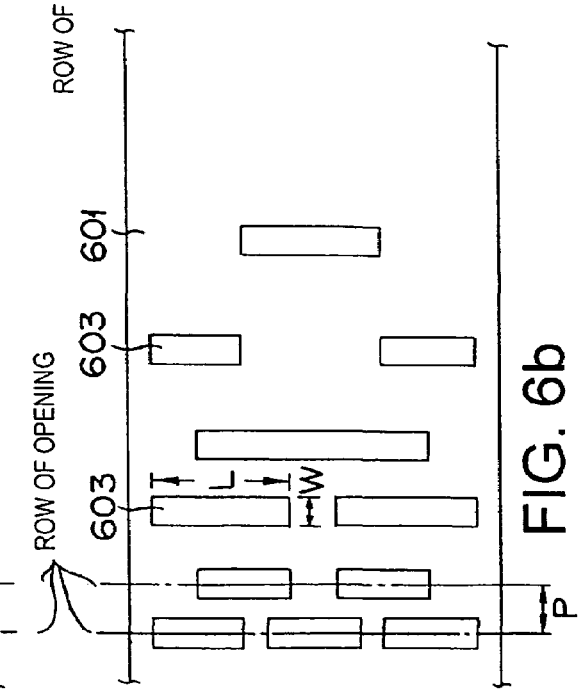
Figure 8A:
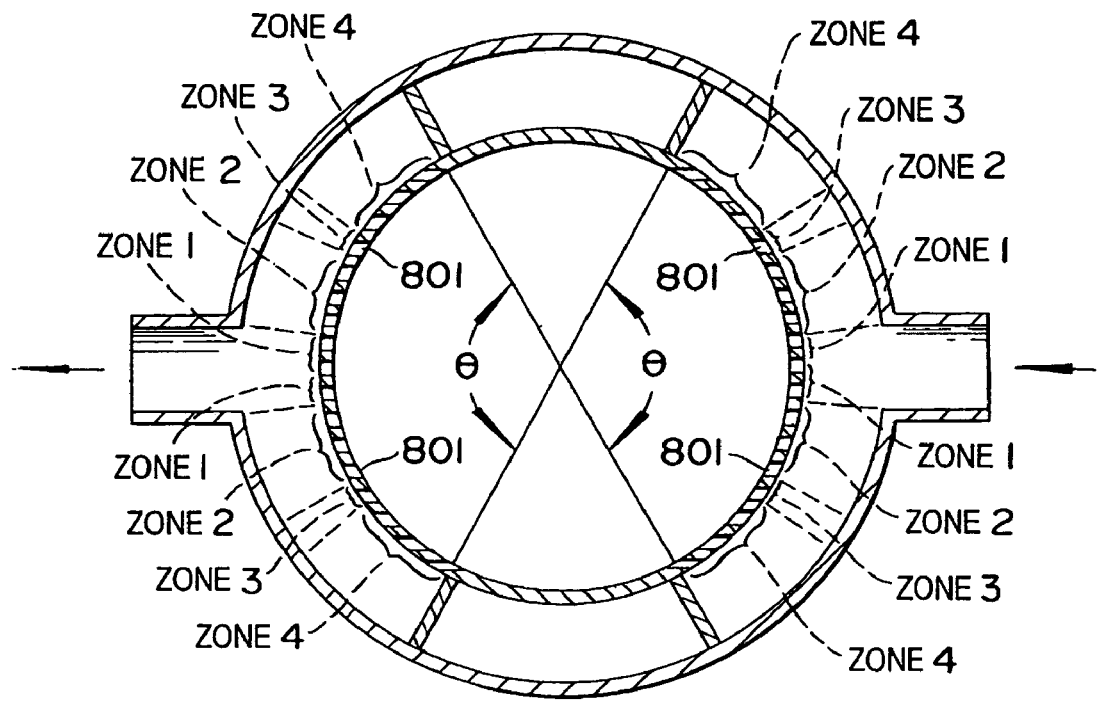
FIG. 8 is a schematic cross section illustrating in type section four zones (Zone 1-Zone 4) in each of the subdivisions delimited with partitions and the center for the inlet for the fluid or the center of the outlet for the fluid in a shell-and-tube type heat exchanger used in the working example, wherein the opening parts of the individual distributors for the shell side fluid are identical in specification and are laterally symmetrical in the circumferential direction from the center of the inlet for fluid or the center of the outlet for fluid.
FIG. 8(b) is a schematic diagram illustrating the array of heat-transfer tubes in FIG. 8(a). The rhombic patterns of the interiors of the shell-and-tube type heat exchangers in FIG. 8(b) illustrates in type section the zone which allows the existence of heat-transfer tubes.
Figure 8B:
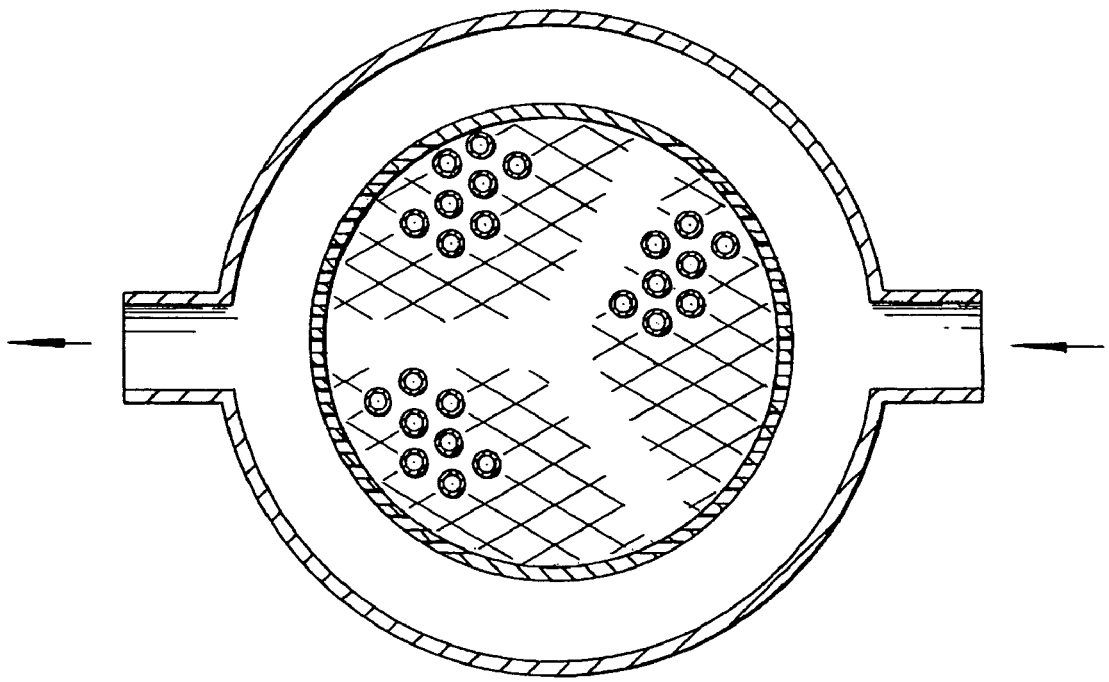

The distributor is possessed of a plurality of rows of openings capable of passing the shell side fluid in order that uniform distribution of the flow of the shell side fluid may be attained within the shell. The number and/or size of these openings may be adjusted when necessary. The ratio of the distributor to the inner periphery of the shell can be indicated by the "central angle of the row of openings" and the term "central angle of the row of openings" means the angle (θ) which is formed by two partitions participating in the construction of the introducing part or the discharging part as illustrated in FIG. 1 and FIG. 8. The central angle of the row of openings is in the range of 90-140° and preferably in the range of 100-130° and the ratio of the opening ratio of the part neighboring the partition to the opening ratio of the part opposed to the nozzle in the row of openings is in the range of 0.9-0.1 and preferably in the range of 0.8-0.2. If the central angle of the row of openings falls short of 90°, the shortage will render uniform flow toward the exterior of the partition difficult. Conversely, if it exceeds 140°, the excess will render uniform flow toward the central part difficult. If the ratio of the opening ratio of the part in the neighboring the partition to the opening ratio of the part opposed to the nozzle in the row of openings exceeds 0.9, the excess will render uniform flow toward the central part difficult. Conversely, if this ratio falls short of 0.1, the shortage will aggravate the pressure drop in the distributor of the partition and necessitate an increase in the head required for the pump circulating the shell side fluid. The expressions "the part opposed to the nozzle" and "the part neighboring the partition" as used in the present specification mean the opposed parts of the introducing or discharging nozzles to be formed by laterally symmetrizing the length in the circumferential direction of the introducing part or the discharging part of the annular conduit relative to the center of the introducing or discharging nozzle and dividing the symmetric portions of the length into four equal parts as illustrated in FIG. 5 and the introducing or discharging nozzle side of the partition forming the introducing part or the discharging part of the annular conduit. The "ratio of opening ratio" is calculated by the following formula.

Ratio of opening ratio=(Area of openings in the part neighboring the partition)/(Area of openings in the part opposed to the nozzle)

This opening ratio is adjusted with the center interval (P) between the adjacent rows of openings, the number of opening parts 603 in each of the rows of openings, and the width of opening (W) and/or the length of opening (L) of the opening part, for example, in a plate member such as, for example, a distributor 601 which separates the annular conduit and the interior of the shell as illustrated in FIG. 6.

The center interval (P) between the adjacent rows of openings may be identical or not identical in the individual rows. It is generally in the range of 50-500 mm, preferably in the range of 70-450 mm, and more preferably in the range of 90-400 mm. If the center interval (P) between the adjacent rows of openings falls short of 50 mm, the shortage will render fabrication of opening parts difficult, depending on the shape thereof. Conversely, if the center interval (P) exceeds 500 mm, the excess will be at a disadvantage in rendering it difficult to obtain uniform distribution of flow.

The number of opening parts in individual rows of openings may be identical or no identical so long as it is not less than 1.

The width of an opening (W) in the opening part is in the range of 2-50%, preferably in the range of 4-40%, and more preferably in the range of 6-30%, based on the center interval (P) between the adjacent rows of openings. If the width of opening (W) is less than 2% based on the center interval (P), the shortage will render it difficult to obtain uniform distribution of flow because of an addition to the area of a non-opening part. Conversely, if it exceeds 50% and the adjacent rows of openings overlap each other, the excess will be at a disadvantage in rendering it difficult to obtain uniform distribution of flow.

The shape of the opening part may be arbitrarily selected from among circular, oblong, elliptic, and rectangular patterns and proper combinations thereof. The size of the opening part may be arbitrary. All the opening parts do not need to be identical in size (refer to FIG. 6).

The length of an opening (L) is in the range of 0.2-20 times, preferably in the range of 0.5-17 times, and more preferably in the range of 0.7-15 times, the width of the opening (W). If the length of the opening (L) falls short of 0.2 times or exceeds 20 times the width of the opening (W), the shortage and the excess will be both at a disadvantage in preventing the opening parts from being uniformly distributed relative to the introducing part and/or the discharging part and, as a result, rendering it difficult to realize substantially uniform contact.

Further, the shell may be provided in the interior thereof with a member intended to maintain uniform contact of the shell side fluid with the heat-transfer tubes. Generally, a clearance measuring several tens of mm occurs between the outer periphery of the bundle of heat-transfer tubes and the inner periphery of the shell. In most cases, the shell side fluid tends to flow through this clearance because the pressure drop from the introducing part through the discharging part via the clearance is small as compared with the pressure drop past the tube bundle. This trend gains in prominence when the number of heat-transfer tubes is large, namely when the inside diameter of the shell is large. This fact means that the uniformity can no longer be maintained in the shell even when the annular conduit and the opening part effect the introduction and/or the discharge substantially uniformly. The clearance mentioned above, therefore, may be furnished with such a member as a baffle plate as when the inside diameter of the shell is large. This member, to which such factors as shape and quantity are irrelevant, is only required to be endowed with such functions of preventing the shell side fluid from flowing through the clearance between the outer periphery of the bundle of heat-transfer tubes and the inner periphery of the shell without obstructing the uniform flow of the shell side fluid past all the heat-transfer tubes from the introducing side to the discharging side inside the shell. Where the annular conduit is divided with four partition into one introducing part, one discharging part, two places having nothing to do with introduction or discharging as illustrated in FIG. 1, the functions mentioned above can be realized by having at least one baffle plate disposed on the inner periphery of the shell corresponding to the place having nothing to do with the introduction and discharging.

In the first and the second aspect of this invention, the annular conduit concurrently serving as an expansion joint for introducing and discharging the shell side fluid may be incorporated in a shell-and-tube type heat exchanger of any sort so long as it is used for the purpose of introducing and discharging the shell side fluid. When the shell part for accommodating numerous heat-transfer tubes is separated as with shields into a plurality of subdivisions designated as a reaction part, a cooling part, and a quenching part, for example, such annular conduits may be incorporated in the reaction part and the quenching part without reference to the designations. Since the incorporation of the annular conduit results in allowing the shell side fluid to flow perpendicularly, the heat exchanger is enabled to obviate the necessity for employing the baffle plate which would be otherwise disposed in the direction of length thereof and reduce itself into a heat exchanger of the smallest possible length for the sake of exchange of heat. When the partition is composed of not less than four component members, the annular conduit excels in the heat-exchanging efficiency because the leakage of the shell side fluid inside the annular conduit can be prevented.

The shell-and-tube type heat exchanger which can be used in this invention does not need to be particularly restricted to the examples cited above. While FIG. 1 illustrates a pattern of upflow of causing the shell side fluid to flow from the lower to the upper part of the shell, the flow may be arbitrarily selected from among various directions and combinations thereof on both the tube side and the shell side. Though FIG. 1 illustrates a vertical shell-and-tube type heat exchanger, it is only natural that this invention can be similarly applied to a horizontal shell-and-tube type heat exchanger.

Concerning the factors (component members and individual constructions thereof) other than the construction of the annular conduit participating in the construction of the shell-and tube type heat exchanger, those heretofore known to the art can be extensively applied without being particularly restricted.

Further, the shell-and-tube type heat exchanger according to this invention can be applied to all the fields that stand in need of a shell-and-tube type heat exchanger at all because it can obtain uniform distribution of flow of the shell side fluid, substantially eliminate the structural restriction on the shell side, and acquire the smallest possible length for the purpose of exchange of heat. In the production of (meth) acrylic acid by the catalytic gas phase oxidation of a raw material gas such as propylene, propane, isobutylene, acrolein, or methacrolein with a molecular oxygen-containing gas in the presence of an oxidizing catalyst, the reaction of catalytic gas phase oxidation generates a large volume of heat. When the heat so generated in a large volume is left to take its own course, it will result in shortening the service life of the catalyst, entailing the danger of explosion, and variation in the selectivity and the yield of the product. The use of the shell-and-tube type heat exchanger of this invention as a shell-and-tube type reactor which is intended for the catalytic gas phase oxidation entailing the generation of a large volume of heat, therefore, is advantageous to the furthest degree in respect that the characteristic features inherent in the shell-and tube type heat exchanger can be efficiently utilized.

The shell-and-tube type heat exchanger according to this invention can be used in part of the shell-and-tube type reactor intended for the catalytic gas phase oxidation (refer to working examples cited hereinafter) besides being used as the shell-and-tube type reactor mentioned above for the catalytic gas phase oxidation. Specifically, in the shell-and-tube type reactor for use in the catalytic gas phase oxidation which has the interior of the shell partitioned with a shield into a reaction part and a quenching part, the quenching part mentioned above may be adapted to be furnished with the heat-exchanging mechanism or device configuration of the shell-and-tube type heat exchanger contemplated by this invention.

Nextly, the method for the production of (meth)acrylic acid according to this invention is characterized by using the shell-and-tube type heat exchanger contemplated by the first or the second aspect of this invention in the shall-and-tube type reactor for catalytic gas phase oxidation. Preferably, the method is characterized by using the aforementioned shell-and-tube type heat exchanger of this invention in the reactor for the catalytic gas phase oxidation. This method of production may use two or more such reactors. To be more specific, the method for producing (meth)acrylic acid by subjecting such a raw material gas as propylene, propane, isobutylene, or methacrolein to catalytic gas phase oxidation in the presence of an oxidizing catalyst is characterized by using the shell-and-tube type heat exchanger according to this invention in the reacting part and/or the quenching part of the shell-and-tube type reactor of the catalytic gas phase oxidation grade in the process for performing a catalytic gas phase oxidation entailing generation of a large volume of heat.

Now, a preferred mode of embodying the method for the production of (meth)acrylic acid according to this invention will be specifically described below by adducing as an example the first step reaction of the process for obtaining methacrylic acid by the two-step reaction of catalytic gas phase oxidation of an isobutylene-containing gas by the use of the shell-and-tube type heat exchanger contemplated by this invention as the reactor for catalytic gas phase oxidation.

As the shell-and-tube type reactor of the catalytic gas phase oxidation grade for use in the method for production contemplated by this invention, this shell-and-tube type reactor of the catalytic gas phase oxidation grade may have the interior of the shell partitioned with a shield into a reaction part and a quenching part and, when the shell side fluid is used in an upflow pattern, the lower parts of reaction tubes which correspond to the reaction part may be packed with a catalyst for catalytic gas phase oxidation and the upper parts of reaction tubes which correspond to the quenching part may be left as empty tubes. The application of the shell-and-tube type reactor does not need to be particularly restricted to this mode. The tube side fluid may be used in a downflow pattern. In this case, the quenching part which is formed of the lower parts of reaction tubes may be packed with a packing incapable of contributing to the relevant reaction. The application of the quenching part does not need to be particularly limited to this mode.

The production of a methacrolein-containing gas from an isobutylene-containing gas by the first-step reaction of the process for the two-step catalytic gas phase oxidation according to the method for production contemplated by this invention is accomplished by using as a reactor a shell-and-tube type heat exchanger having the interior of the shell thereof partitioned with a shield into a reaction part and a quenching part, introducing the isobutylene-containing gas into the lower parts of reaction tubes packed with a catalyst for the first-step catalytic gas phase oxidation, subjecting the gas to catalytic gas phase oxidation in the lower parts of reaction tubes (the reaction part) thereby forming a methacrolein-containing gas, and cooling this gas in the subsequent upper parts of reactors (the quenching part). The quenching is necessary because methacrolein has a property of yielding to autoxidation and this methacrolein, when suffered to stagnate at the reaction temperature of the first step in the reactor and/or the piping thereof, has the possibility of not merely lowering the yield but also inducing an explosive combustion reaction. At this time, in the quenching part, the exchange of heat is enabled to proceed efficiently and the temperature of the methacrolein-containing gas to fall to the prescribed level in an extremely short span of time by using the shell-and-tube type heat exchanger of the first aspect of this invention as the shell-and-tube type reactor thereby substantially uniformizing the shell side fluid throughout the whole of the reaction tubes and causing the fluid to flow substantially perpendicularly to the axial direction of the reaction tubes. By using the shell-and-tube type heat exchanger according to the second aspect of this invention as a shell-and-tube type reactor, since the partition is composed of at least four component members, it is made possible to prevent the leakage of the shell side fluid through the partition even when this plate incurs thermal shrinkage due to change of temperature and to accomplish alleviation of stress in conjunction with the prevention of the leakage of the shell side fluid. Naturally, the shell-and-tube type reactor contemplated by this invention can be utilized as the first-step reactor and/or the second-step reactor, and the quenching part.

In the production of methacrylic acid by the two-step reaction of catalytic gas phase oxidation of isobutylene, t-butanol, or methyl-t-butyl ether as contemplated by this invention, as the catalyst with which the reaction tubes in the reactor are to be packed, the oxidizing catalyst which is generally used as the first-step catalyst in the production of methacrolein by the reaction of gas phase oxidation of a raw material gas containing isobutylene, for example, may be used. By the same token, the second-step catalyst does not need to be particularly restricted but may adopt the oxidizing catalyst generally used in producing methacrylic acid by the gas phase oxidation of a reaction gas containing mainly methacrolein which is obtained in the former step of the process for the two-step catalytic gas phase oxidation.

As concrete examples of the first-step catalyst, the compositions represented by the general formula, $Mo_a$—$W_b$—$Bi_c$—$Fe_d$—$A_e$—$B_f$—$C_g$—$D_h$—$O_x$ (wherein Mo, W, and Bi denote molybdenum, tungsten, and bismuth respectively, Fe denotes iron, A denotes nickel and/or cobalt, B denotes at least one element selected from the group consisting of alkali metals, alkaline earth metals, and thallium, C denotes at least one element selected from the group consisting of phosphorus, tellurium, antimony, tin, cerium, lead, niobium, manganese, and zinc, D denotes at least one element selected from the group consisting of silicon, aluminum, titanium, and zirconium, O denotes oxygen, and a, b, c, d, e, f, g, h, and x respectively denote the numbers of the Mo, W, Bi, Fe, A, B, C, D, and O atoms such that the ranges, b=0-10, c=0.1-10, d=0.1-20, e=2-20, f=0.001-10, g=0-4, and h=0-30 are satisfied when a=12 is fixed, and x assumes the numerical value which is fixed by the states of oxidation of the individual elements) may be cited preferably.

The second-step catalyst does not need to be particularly restricted but is only required to be formed of one or more oxides containing molybdenum and phosphorus as main components thereof. It is preferred to be a phosphomolybdic acid type heteropoly acid or a metal salt thereof. The compositions represented by the general formula, $MO_a$—$P_b$—$A_c$—$B_d$—$C_e$—$D_f$—$O_x$ (wherein Mo denotes molybdenum, P denotes phosphorus, A denotes at least one element selected from the group consisting of arsenic, antimony, germanium, bismuth, zirconium, and selenium, B denotes at least one element selected from the group consisting of copper, iron, chromium, nickel, manganese, cobalt, tin, silver, zinc, palladium, rhodium, and tellurium, C denotes at least one element selected from the group consisting of vanadium, tungsten, and niobium, D denotes at least one element selected from the group consisting of alkali metals, alkaline earth metals, and thallium, O denotes oxygen, and a, b, C, d, e, f, and x respectively denote the numbers of the Mo, P, A, B, C, D, and O atoms such that the ranges, b=0.5-4, c=0-5, d=0-3, e=0-4, and f=0.01-4 are satisfied when a=12 is fixed, and x assumes the numerical value which is fixed by the states of oxidation of the individual elements) may be preferably cited as concrete examples.

Further, this invention, in obtaining acrylic acid by subjecting propylene to the two-step reaction of catalytic gas phase oxidation, allows adoption as the catalyst to fill the reaction tubes of the reactor the oxidizing catalyst which is generally used in the production of acrolein by the reaction of gas phase oxidation of a raw material gas containing propylene. As the second-step catalyst which does not need to be particularly restricted, the oxidizing catalyst which is generally used in producing acrylic acid by subjecting to gas phase oxidation the reaction gas containing mainly acrolein and obtained by the former step of the two-step process for catalytic gas phase oxidation.

As concrete examples of the first-step catalyst, the compositions represented by the general formula, $Mo_a$—$Bi_b$—$Fe_c$—$A_d$—$B_e$—$C_f$—$D_g$—$O_x$ (wherein Mo, Bi, and Fe respectively denote molybdenum, bismuth, and iron, A denotes at least one element selected from the group consisting of nickel and cobalt, B denotes at least one element selected from the group consisting of alkali metals and thallium, C denotes at least one element selected from the group consisting of phosphorus, niobium, manganese, cerium, tellurium, tungsten, antimony, and lead, D denotes at least one element selected from the group consisting of silicon, aluminum, zirconium, and titanium, O denotes oxygen, and a, b, c, d, e, f, g, and x respectively denote the ratios of the Mo, Bi, Fe, A, B, C, D, and O atoms such that the ranges, b=0.1=10, c=0.1-10, d=2-20, e=0.001-5, f=0-5, and g=0-30 are satisfied when a=12 is fixed, and x assumes the numerical value to be fixed by the states of oxidation of the individual elements) may be cited, though not exclusively.

As concrete examples of the second-step catalyst, the compositions represented by the general formula, $Mo_a$—$V_b$—$W_c$—$Cu_d$—$A_e$—$B_f$—$C_g$—$O_x$ (wherein Mo denotes molybdenum, V, vanadium, W, tungsten, and Cu, copper, A denotes at least one element selected from the group consisting of antimony, bismuth, tin, niobium, cobalt, iron, nickel, and chromium, B denotes at least one element selected from the group consisting of alkali metals, alkaline earth metals, and thallium, C denotes at least one element selected from the group consisting of silicon, aluminum, zirconium, and cerium, O denotes oxygen, and a, b, c, d, e, f, g, and x respectively denote the ratios of the Mo, V, W, Cu, A, B, C and O atoms such that the ranges, b=2-14, c=0-12, d=0.1-5, e=0-5, f=0-5, and g=0-20 are satisfied when a=12 is fixed, and x assumes the numerical value to be fixed by the states of oxidation of the individual elements) may be cited, though not exclusively.

The shape of the catalyst does not need to be particularly restricted. The catalyst may be in a spherical, columnar, or cylindrical shape. It may be formed by such techniques as carrying molding, extrusion molding, and tabletting molding, for example. Further, the catalyst obtained by depositing a catalytic substance on a refractory carrier is useful.

The reaction of catalytic gas phase oxidation of propylene or isobutylene with molecular oxygen can be carried out under the conditions which are adopted by the method heretofore known to the art. In the case of propylene, for example, the propylene concentration in the raw material gas is in the range of 3-15 vol. %, the ratio of molecular oxygen to propylene is in the range of 1-3, and the remainder of the raw material gas comprises nitrogen, steam, carbon oxides, and propane, etc.

Air is advantageously used as the source for supply of the molecular oxygen. The oxygen-enriched air and the pure oxygen may be used as occasion demands. The molecular oxygen is supplied by the one-pass method or the recycling method.

In the mode of embodiment described above, preferably the reaction temperature in the reacting part is in the range of 250-450° C., the reaction pressure in the range of normal pressure to 5 atmospheres, and the space velocity in the range of 500-3000 $hr^{-1}$ (STP).

In the case of the reaction of catalytic gas phase oxidation of isobutylene, the isobutylene concentration in the raw material gas is in the range of 1-10 vol. %, the concentration of the molecular oxygen relative to isobutylene is in the range of 3-20 vol. %, the concentration of steam is in the range of 0-60 vol. %, and the remainder of the raw material gas comprises nitrogen, steam, and carbon oxides, etc. Though air is advantageously used as the source for supply of the molecular oxygen, the oxygen-enriched air and the pure oxygen may be used as occasion demands.

In the mode of embodiment described above, preferably the reaction temperature in the reacting part is in the range of 250-450° C., the reaction pressure in the range of normal pressure to 5 atmospheres, and the space velocity in the range of 300-5000 $hr^{-1}$ (STP).

The preceding example has described the method for producing (meth)acrylic acid by the use of the reactor for catalytic gas phase oxidation, with the principal requirement for construction of this invention endowed to the quenching part formed as separated with a shield in the reactor. Naturally, the reacting part formed by the partitioning may be endowed with the principal requirement for the construction of this invention. The yield of the reaction may be enhanced, for example, by dividing the reacting part into a plurality of steps with shields and changing the temperature of the shell side fluid between the adjacent steps. In this case, while the direction of flow of the shell side fluid may be arbitrarily selected in the different steps, the position for the introduction of the fluid is preferred to be identical in all the steps for the purpose of minimizing the leakage of the fluid through the shields.

The shell side fluid and the raw material gas in the reacting part may form a parallel flow or a counter flow in the place of the perpendicular flow mentioned above. In this case, the shell side fluid may be advance in a downflow or an upflow. When a disc-and-doughnut type baffle is adopted on the shell side, it is preferable for the purpose of minimizing the leakage of the shell side fluid between the adjacent chambers to set this baffle so that the shell side fluid outlet part of the reacting part may form a connecting part, i.e. a shielding part, between the quenching part and the reacting part. The installation of equipment is facilitated by advancing the shell side fluid in an upflow pattern in the reacting part. When the disc-and-doughnut type baffle is used in the reacting part and the construction contemplated by this invention is used in the quenching part, therefore, the construction forming the reacting part on the lower side and the quenching part on the upper side proves preferable.

The method for production according to this invention, by using the shell-and-tube type reactor constructed as described above, is enabled to produce maleic anhydride with a known catalyst in a known reaction system from benzene or butane as the raw material gas or to produce phthalic anhydride with a known catalyst in a known reaction system from xylene and/or naphthalene as the raw material gas.

In the method for production contemplated by this invention, as the shell side fluid to be circulated in the shell-and-tube type reactor constructed as described above, any of the fluids heretofore known to the art can be used in either of the reacting part and the quenching part. Molten salt, niter, and the phenyl ether type heat transfer media, i.e. the organic heat transfer media such as Dowtherm are available, for example.

EXAMPLES

Now, this invention will be specifically described below with reference to working examples. In all the working examples and comparative examples cited herein, one partition was formed of the four members illustrated in FIG. 3.

Example 1

A heat exchanger was formed the shell side of a reactor for catalytic gas phase oxidation which is divided with a shield into a reacting part and a quenching part. Air was passed on the tube side and molten salt on the shell side respectively of the heat exchanger. The temperature inside the reaction tubes of the quenching part was measured. The conditions of the fluid and the specifications of the heat exchanger in the quenching part were as shown below.

| Tube side | |
|---|---|
| Outside diameter of heat-transfer tube | 29.6 mm |
| Available length of heat-transfer tube | 650 mm |
| Number of heat-transfer tubes | 7500 |
| Flow rate of air | 200 Nm$^3$/min |
| Inlet temperature of air quenching part | 300° C. |

| Shell side | |
|---|---|
| Flow rate of molten salt | 200 m$^3$/h |
| Inlet temperature of molten salt in quenching part | 280° C. |
| Inside diameter of shell | 3600 mm |
| Diameter of central place having no array of heat-transfer tubes (The "diameter" means the diameter of the cylinder inscribing the empty space and cylinder measuring 300 mm in diameter and having the length of the axial direction of the shell was installed in the central part.) | 360 mm |
| Width and number of linear places having no array of heat-transfer tubes in the direction from the outer peripheral part toward the center (The "width" means the width corresponding to the rectangle inscribing the linear places having no array of heat-transfer tubes. The angles forming the rows were each set at 120° and the linear parts were left empty.) | 15 mm, 3 rows |
| Percentage of total sectional area of the place having no array of heat-transfer tubes relative to the sectional area of the shell | 1.7% |
| Baffle plate in the shell | None |
| Height of annular conduit (length in the axial direction of the heat-transfer tubes) (The annular conduit was positioned at the center of the axial direction of the shell relative to the available length of the heat-transfer tubes.) | 400 mm |
| Width of annular conduit (length in the radial direction of the shell) | 100 mm |
| Center angle of annular conduit (θ: refer to FIG. 8) | 120° |
| Connecting part between introducing nozzle and discharging nozzle on the shell side (the inlet and the outlet had the same specifications) | |
| Diameter of nozzle | 250 mm |
| Height of connecting part adjoining annular conduit (length in the axial direction of tubes) | 300 mm |
| Width of connecting part adjoining annular conduit (length in the circumferential direction of shell) | 400 mm |
| Width of protuberance in connecting part (length in the radial direction of shell | 100 mm |

Opening part (The inlet and the outlet had the same specifications and were laterally symmetrized in the circumferential direction with the fluid inlet or outlet as the center and were each divided into four zones; refer to FIG. 8)

| All zones in common | |
|---|---|
| Length in the axial direction of tubes | 550 mm |
| Shape of opening | Circular |
| Diameter of holes | 25 mm |
| Zone 1 (fluid inlet and outlet part) | |
| Center interval between rows of opening | 60 mm |
| Number of holes/rows of opening | 10 |
| Number of rows of opening | 6 |

-continued

| Zone 2 | | |
|---|---|---|
| Center interval between rows of opening | 70 | mm |
| Number of holes/rows of opening | 8 | |
| Number of rows of opening | 8 | |
| Zone 3 | | |
| Center interval between rows of opening | 80 | mm |
| Number of holes/rows of opening | 6 | |
| Number of rows of opening | 4 | |
| Zone 4 | | |
| Center interval between rows of opening | 100 | mm |
| Number of holes/rows of opening | 4 | |
| Number of rows of opening | 6 | |

The air temperature at the outlet of the quenching part was 288° C. The results of the measurement of the temperature on the tube side and the results of the verification by means of simulation of the heat exchanger having the same conditions and specifications as in Example 1 were as shown in Table 1 given herein below. The data reproduced measured values with high accuracy. The results of simulation performed by altering the conditions of fluid and the specifications of the heat exchanger in the quenching part as shown below are indicated in Table 2.

Example 2

The points of alteration relative to Example 1 will be recorded below.

| Tube side | |
|---|---|
| Number of heat-transfer tubes | 21000 |
| Flow rate of air | 550 Nm³/min |
| Shell side | |
| Flow rate of molten salt | 500 m³/h |
| Inside diameter of shell | 6000 mm |
| Diameter of central place having no array of heat-transfer tubes (An inner cylinder measuring 550 mm in diameter and having the length of the axial direction of tube was disposed in the central part.) | 600 mm |
| Percentage of total sectional area of the place having no array of heat-transfer tubes relative to the sectional area of the shell) | 1.4% |
| Width of annular conduit (length in the radial direction of shell) | 300 mm |
| Connecting part between introducing nozzle and discharging nozzle on the shell side (the inlet and the outlet had the same specifications) | |
| Diameter of circulating pipe | 350 mm |
| Height of connecting part adjoining annular conduit (length in the axial direction of tubes) | 350 mm |
| Width of connecting part adjoining annular conduit (length in the circumferential direction of shell) | 500 mm |
| Width of protuberance in connecting part (length in the radial direction of shell | 100 mm |

| Opening part | |
|---|---|
| Zone 1 | |
| Number of rows of opening | 10 |

| Opening part | |
|---|---|
| Zone 2 | |
| Number of rows of opening | 12 |
| Zone 3 | |
| Number of rows of opening | 8 |
| Zone 4 | |
| Number of rows of opening | 10 |

Example 3

The points of alteration relative to Example 2 will be recorded below.

Connecting part between introducing nozzle and discharging nozzle on the shell side (the inlet and the outlet had the same specifications)

| Height of connecting part adjoining the annular conduit (length in the axial direction of tube) | 350 mm |
|---|---|
| Width of connecting part adjoining the annular conduit (length in the circumferential direction of shell) | 350 mm |

Example 4

The points of alteration relative to Example 2 will be recorded below.

| Shell side | |
|---|---|
| Center angle (θ) of annular conduit | 90° |
| Opening part | |
| Zone 1 | |
| Number of rows of opening | 8 |
| Zone 2 | |
| Number of rows of opening | 10 |
| Zone 3 | |
| Number of rows of opening | 5 |
| Zone 4 | |
| Number of rows of opening | 7 |

Example 5

The points of alteration relative to Example 2 will be recorded below.

| Shell side | |
|---|---|
| Center angle (θ) of annular conduit | 140° |
| Opening part | |
| Zone 1 | |
| Number of rows of opening | 12 |

-continued

| Zone 2 | |
|---|---|
| Number of rows of opening | 14 |
| Zone 3 | |
| Number of rows of opening | 9 |
| Zone 4 | |
| Number of rows of opening | 12 |

Example 6

The points of alteration relative to Example 2 will be recorded below.

| Opening part | |
|---|---|
| Zone 1 | |
| Center interval between rows of opening | 69 mm |
| Number of holes/rows of opening | 7 |
| Number of rows of opening | 12 |
| Zone 2 | |
| Center interval between rows of opening | 69 mm |
| Number of holes/rows of opening | 7 |
| Number of rows of opening | 11 |
| Zone 3 | |
| Center interval between rows of opening | 69 mm |
| Number of holes/rows of opening | 7 |
| Number of rows of opening | 11 |
| Zone 4 | |
| Center interval between rows of opening | 69 mm |
| Number of holes/rows of opening | 7 |
| Number of rows of opening | 11 |

Comparative Example 1

The points of alteration relative to Example 1 will be recorded below.

| Shell side | |
|---|---|
| Diameter of central place having no array of heat-transfer tubes | Not applicable |
| Width of linear part having no array of heat-transfer tubes in the direction from the outer peripheral part toward the center | Not applicable |
| Number of linear parts having no array of heat-transfer tubes in the direction from the outer peripheral part toward the center | Not applicable |
| Percentage of total sectional area of the place having no array of heat-transfer tubes relative to the sectional area of the shell | 0% |

Comparative Example 2

The points of alteration relative to Example 2 will be recorded below.

| | |
|---|---|
| Diameter of central place having no array of heat-transfer tubes | Not applicable |
| Width of linear place having no array of heat-transfer tubes in the direction from the outer peripheral part toward the center | Not applicable |
| Number of linear parts having no array of heat-transfer tubes in the direction from the outer peripheral part toward the center | Not applicable |
| Percentage of total sectional area of the place having no array of heat-transfer tubes relative to the sectional area of the shell | 0% |

Figure 7A:
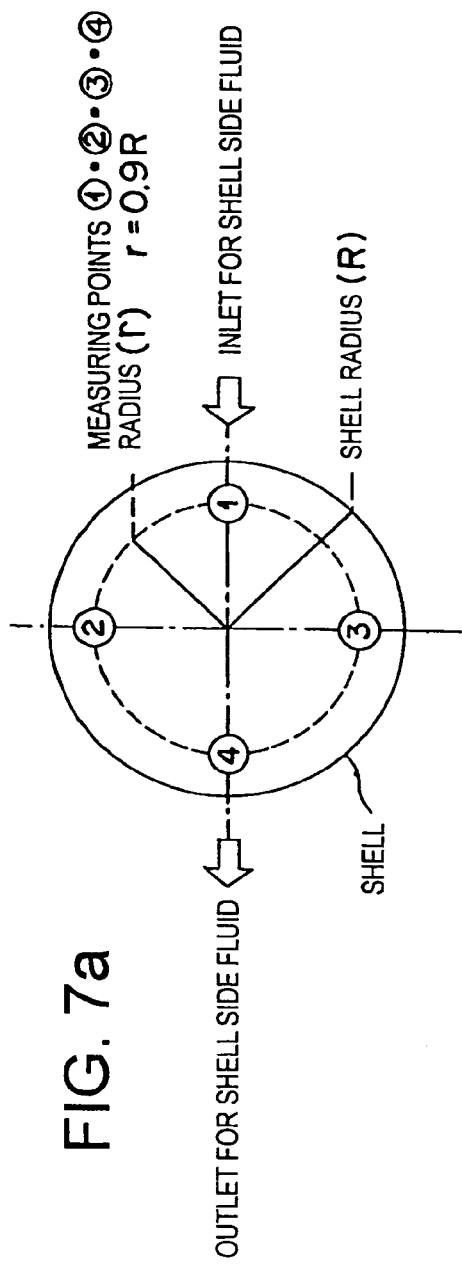
FIG. 7(a) is a cross section illustrating the positions 1̂-4̂ for the measurement in a section taken in the radial direction of the shell of the heat exchanger and FIG. 7(b) is a cross section illustrating the positions A -C for the measurement in a section taken in the axial direction of the shell of the heat exchanger.
Figure 7B:
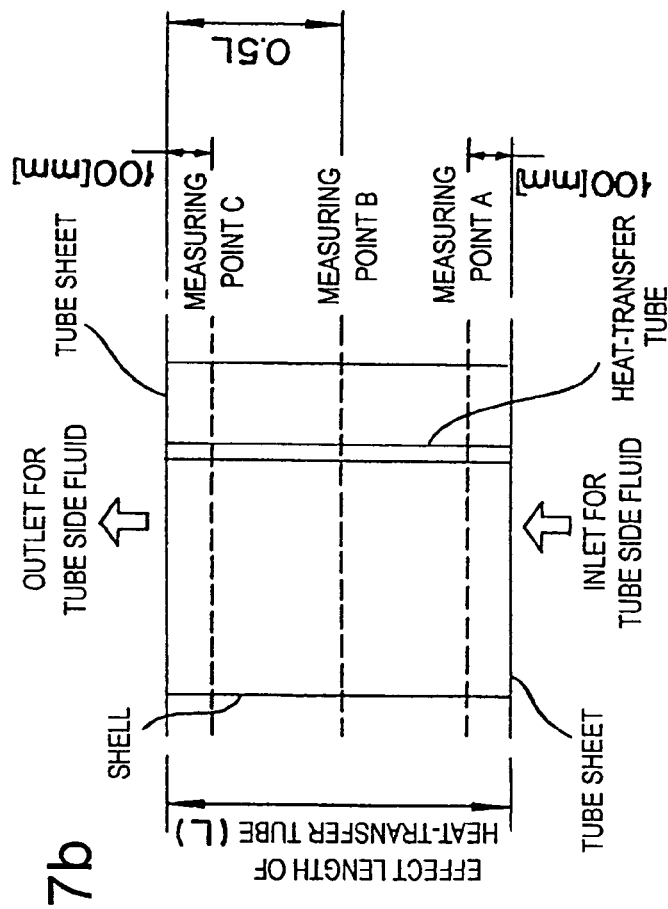

The positions ①-④ of measurement indicates in Table 1 and Table 2 represent ①-④ in the sectional diagram in the radial direction of the shell of the heat exchanger illustrated in FIGS. 7(a) and A, B, and C represent the positions on the intersections of A-C in the sectional diagram in the axial direction of the tubes of the heat exchanger illustrated in FIG. 7(b).

TABLE 1

Temperature on tube side, measured/calculated [° C.]

| Position of measurement | Measured value in Example 1 | Calculated value in Example 1 |
|---|---|---|
| ①-A | 291 | 293 |
| ①-B | 287 | 287 |
| ①-C | 287 | 287 |
| ②-A | 293 | 292 |
| ②-B | 290 | 289 |
| ②-C | 289 | 287 |
| ③-A | 293 | 292 |
| ③-B | 289 | 290 |
| ③-C | 287 | 289 |
| ④-A | 293 | 294 |
| ④-B | 290 | 289 |
| ④-C | 288 | 288 |
| Temperature at outlet | 288 | 288 |

TABLE 2

Temperature on tube side, calculated [° C.]

| Position of measurement | Calculated in Example 1 | 2 | 3 | 4 | 5 | comparative Example 1 | 2 |
|---|---|---|---|---|---|---|---|
| ①-A | 293 | 292 | 292 | 296 | 299 | 298 | 300 |
| ①-B | 288 | 287 | 289 | 293 | 293 | 295 | 297 |
| ①-C | 287 | 286 | 288 | 290 | 293 | 295 | 297 |
| ②-A | 292 | 293 | 296 | 291 | 292 | 292 | 292 |
| ②-B | 288 | 289 | 291 | 288 | 287 | 289 | 289 |
| ②-C | 287 | 289 | 291 | 287 | 286 | 286 | 288 |
| ③-A | 293 | 294 | 296 | 292 | 291 | 293 | 291 |
| ③-B | 290 | 289 | 292 | 288 | 288 | 287 | 288 |
| ③-C | 288 | 289 | 292 | 288 | 287 | 287 | 287 |
| ④-A | 295 | 297 | 294 | 298 | 298 | 299 | 299 |
| ④-B | 290 | 293 | 289 | 293 | 293 | 298 | 299 |
| ④-C | 288 | 292 | 288 | 293 | 293 | 297 | 297 |
| Temperature at outlet | 288 | 289 | 289 | 290 | 290 | 294 | 295 |

The invention claimed is:

1. A method for the production of (meth)acrylic acid which comprises the step of:

subjecting to oxidation of a raw material gas of propylene, propane, isobutylene, t-butanol, acrolein or methacrolein with a molecular oxygen-containing gas in gas phase by using a catalytic gas phase oxidation reactor a shell-and-tube type heat exchanger in said shell-and-tube type heat exchanger provided with one annular conduit furnished with not less than two partitions concurrently serving as an expansion joint for introducing and discharging a shell side fluid and allowing the flow path for said shell side fluid to be separated into an introducing part and a discharging part, which partition is composed of not less than four component members, wherein said annular conduit is possessed of the following characteristic features:

(i) that said annular conduit is provided with one introducing and one discharging nozzle for said shell side fluid and said nozzles are possessed of a sectional area 1.1-5.0 times the sectional area of the pipe for introducing and discharging said shell side fluids at the connecting part adjoining the annular conduit;

(ii) that a distributor provided in said shell is possessed of a plurality of rows of opening for passing the shell side fluid, the center angle of said rows of opening is in the range of 90-140°, and the ratio of the opening ratio of the part in the neighborhood of the partition to the opening ratio of the part of said rows of opening opposed to the nozzle is in the range of 0.9-0.1.

2. The method according to claim 1, wherein said heat exchanger comprises a place having no array of heat-transfer tubes in the flow path for said shell side fluid inside the shell, wherein total sectional area of the place having no array of heat transfer tubes is in the range of 0.25-10% based on the sectional area of the shell, wherein the place having no array of heat-transfer tubes is formed in the central part of the tube bundle.

3. The method according to claim 2, wherein the place having no array of heat-transfer tubes is formed as linear parts directed from the outer periphery toward the center.

4. The method according to claim 1, wherein said heat exchanger comprises a place having no array of heat-transfer tubes in the flow path for said shell side fluid inside the shell, wherein total sectional area of the place having no array of heat transfer tubes is in the range of 0.25-10% based on the sectional area of the shell, which is enabled to acquire the small pressure drop difference within the shell while the shell side fluid is passing the internal of the shell.

5. The method according to claim 1, wherein the raw material gas of (meth)acrylic acid is at least one member selected from the group consisting of propylene, propane, acrolein, isobutylene, and methacrolein.

6. The method according to claim 1, wherein the raw material gas of (meth)acrylic acid is at least one member selected from the group consisting of propylene and acrolein.

* * * * *